(12) United States Patent
Huang et al.

(10) Patent No.: US 11,544,356 B2
(45) Date of Patent: Jan. 3, 2023

(54) SYSTEMS AND METHODS FOR DYNAMIC FLEXIBLE AUTHENTICATION IN A CLOUD SERVICE

(71) Applicant: Citrix Systems, Inc., Fort Lauderdale, FL (US)

(72) Inventors: Feng Huang, Cambridge (GB); Jean-Luc Giraud, Cambridge (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 488 days.

(21) Appl. No.: 15/626,881

(22) Filed: Jun. 19, 2017

(65) Prior Publication Data

US 2018/0367526 A1 Dec. 20, 2018

(51) Int. Cl.
*G06F 21/31* (2013.01)
*H04L 9/40* (2022.01)
(Continued)

(52) U.S. Cl.
CPC ............ *G06F 21/31* (2013.01); *H04L 9/0891* (2013.01); *H04L 9/3213* (2013.01);
(Continued)

(58) Field of Classification Search
CPC ... H04L 63/083; H04L 9/0891; H04L 9/3213; H04L 9/3297; H04L 63/06; H04L 63/08; H04L 63/0807; H04L 63/0815; H04L 63/0853; H04L 63/105; G06F 21/31; G06F 2221/2131; H04W 12/06
See application file for complete search history.

(56) References Cited

U.S. PATENT DOCUMENTS

| 8,151,116 B2 * | 4/2012 | van der Horst | G06F 21/42 705/405 |
| 8,788,419 B2 * | 7/2014 | Samuels | H04L 63/20 705/42 |

(Continued)

FOREIGN PATENT DOCUMENTS

| JP | 2003196566 A | 7/2003 |
| JP | 2010525448 A | 7/2010 |

OTHER PUBLICATIONS

International Search Report and Written Opinion dated Jul. 26, 2018 for PCT/IB2018/053436.

*Primary Examiner* — Bassam A Noaman
(74) *Attorney, Agent, or Firm* — Fox Rothschild LLP; Robert J. Sacco; Carl E. Thorstadt-Forsyth

(57) ABSTRACT

Systems and methods for authenticating a user requesting access to a resource in a cloud-computing system. The methods comprise, by a resource service: receiving an access request for accessing a resource associated with the resource service from a computing device associated with a user, determining context information corresponding to the access request, and using the determined context information for identifying an authentication protocol for authenticating the user. The authentication protocol includes at least one authentication scheme. The methods further comprise generating an authentication challenge and transmitting the authentication challenge to the computing device. The authentication challenge includes an initial token and authentication parameters corresponding to the identified authentication protocol.

19 Claims, 5 Drawing Sheets

(51) Int. Cl.
  *H04L 9/32* (2006.01)
  *H04L 9/08* (2006.01)
  *H04W 12/06* (2021.01)
  *H04W 12/069* (2021.01)

(52) U.S. Cl.
  CPC ............ *H04L 9/3297* (2013.01); *H04L 63/06* (2013.01); *H04L 63/08* (2013.01); *H04L 63/083* (2013.01); *H04L 63/0807* (2013.01); *H04L 63/0815* (2013.01); *H04L 63/0853* (2013.01); *H04L 63/105* (2013.01); *H04W 12/068* (2021.01); *H04W 12/069* (2021.01); *G06F 2221/2131* (2013.01)

(56) References Cited

U.S. PATENT DOCUMENTS

| | | | |
|---|---|---|---|
| 8,925,053 B1 | 12/2014 | Mehta | |
| 9,935,934 B1* | 4/2018 | Orozco | H04L 63/0815 |
| 2009/0320103 A1* | 12/2009 | Veeraraghavan | G06F 21/335 |
| | | | 726/4 |
| 2010/0077457 A1* | 3/2010 | Xu | H04L 63/08 |
| | | | 726/4 |
| 2011/0307947 A1* | 12/2011 | Kariv | H04L 63/08 |
| | | | 726/9 |
| 2015/0193781 A1* | 7/2015 | Dave | H04L 63/20 |
| | | | 705/318 |
| 2015/0334099 A1* | 11/2015 | Zhang | G06F 21/73 |
| | | | 726/6 |
| 2016/0087957 A1 | 3/2016 | Shah et al. | |
| 2016/0094531 A1 | 3/2016 | Unnikrishnan et al. | |
| 2016/0094543 A1 | 3/2016 | Innes et al. | |
| 2016/0191528 A1* | 6/2016 | McMurtry | G06F 21/335 |
| | | | 726/4 |
| 2018/0227288 A1* | 8/2018 | Zhu | H04L 63/083 |
| 2018/0351925 A1* | 12/2018 | Badri | H04L 63/105 |
| 2018/0367526 A1 | 12/2018 | Huang et al. | |

* cited by examiner

SYSTEMS AND METHODS FOR DYNAMIC FLEXIBLE AUTHENTICATION IN A CLOUD SERVICE

BACKGROUND

Statement of the Technical Field

The present disclosure relates generally to cloud computing systems. More particularly, the present invention relates to implementing systems and methods for user authentication in a cloud environment that enables enhanced security.

DESCRIPTION OF THE RELATED ART

Cloud computing allows a user to utilize applications or services running on a remotely located computer rather than on the user's local computer. For example, data may be processed in the cloud by forwarding the data from a client computer to a server computer, where the data is processed before returning the processed data back to the client computer. This way, the client computer offloads processing tasks to computers in the cloud. While cloud computing has many advantages, authentication of users to control access to a resource in the cloud environment is a significant challenge for system administrators.

Initially user name and password served as a valid means for protecting digital information and access to resources. As an alternative to user names and passwords, stronger forms of "factor" authentication may also be used. "Factor" authentication provides a secure method to prevent unauthorized access to personal, corporate, and government digital information. Two-factor, three-factor and four-factor authentication employ tools such as contact based smart cards, biometric devices, Knowledge-Based Authentication, identity validation services and One-Time Password tokens. "Factors" of authentication can be categorized into physical non-human devices that are "something you have", human biometrics that are "something you are", human memory that is "something you know" and personal validation of public records or third-party verification services and the alike that are "something somebody else knows about you". Typically, administrators and system owners only provide one or in some cases two methods of authenticating users or networked based systems.

Furthermore, server can authenticate a client or a user for an application or a resource by configuring with an authentication model for authenticating a client. However, the current rigid policy structure of the authentication models may limit the types or functionality of authentication models with which the server can be configured. Specifically, the current authentication models are configured to be a one size fits all approach to user access. Various authentication models and/or applications are either installed and turned on or uninstalled and not present on a system. There is no in-between or flexibility for the system owner or administrator to control the log on environment dynamically or automatically based upon the organization's or system owner's requirements or policies. However, a single computer system, for example, may include different types of users with different levels of permissions to a variety of different resources within the system. Due to the variety of users and resources within a system, administrators may desire to use multiple authentication mechanisms to protect different resources. Maintenance of multiple authentication mechanisms, however, can significantly burden an administrator and the system as a whole.

SUMMARY

Implementing systems and methods for authenticating a user requesting access to a resource in a cloud-computing system. The methods may include, by a resource service: receiving an access request for accessing a resource associated with the resource service from a computing device associated with a user, determining context information corresponding to the access request, and using the determined context information for identifying an authentication protocol for authenticating the user. The authentication protocol includes at least one authentication scheme. The methods further include generating an authentication challenge and transmitting the authentication challenge to the computing device. The authentication challenge includes an initial token and authentication parameters corresponding to the identified authentication protocol. In some scenarios, the resource service may save the initial token. In some scenarios, the context information comprises one or more characteristics of the user, one or more characteristics of the resource, and/or one or more characteristics of the computing device.

In some scenarios, the methods may further include identifying an authentication service for executing the at least one authentication scheme, and including the identification of the authentication service in the authentication parameters. The computing device, upon receipt of the authentication challenge, transmits an authentication request to the identified authentication service, wherein the authentication request comprises the initial token. The authentication service may then execute the at least one authentication scheme, and transmit an updated token to the computing device, wherein the updated token includes an assertion indicating a status of user authentication upon execution of the at least one authentication scheme. The computing device, upon receipt of the updated token, may determine whether all authentication schemes included in the identified authentication protocol have been executed, and transmit the updated token to the resource service if all authentication schemes included in the identified authentication protocol have been executed. The computing device transmits the updated token to a second authentication service if all authentication schemes included in the identified authentication protocol have not been executed.

In such or other scenarios, the resource service grants the access request for accessing the resource if the one or more assertions included in the updated token satisfy the identified authentication protocol. In those or other scenarios, the resource service, discards the updated token and/or the initial token upon granting the access request for accessing the resource. In such or other scenarios, the resource service may also determine whether a timestamp associated with the updated token is within a threshold time limit, and grant the access request for accessing the resource only if the timestamp is within the threshold time limit.

In some scenarios, the initial token includes an initial assertion indicating successful authentication of one or more authentication credentials included in the access request.

In some scenarios, the access request comprises user information identifying the user, and determining the context information corresponding to the access request comprises determining the context information based on the user information.

In some scenarios using the determined context information for identifying the authentication protocol for authenticating the user comprises determining an authentication level based on the determined context information, and identifying the authentication protocol corresponding the authentication level.

BRIEF DESCRIPTION OF THE DRAWINGS

Embodiments will be described with reference to the following drawing figures, in which like numerals represent like items throughout the figures.

DETAILED DESCRIPTION

Figure 1:
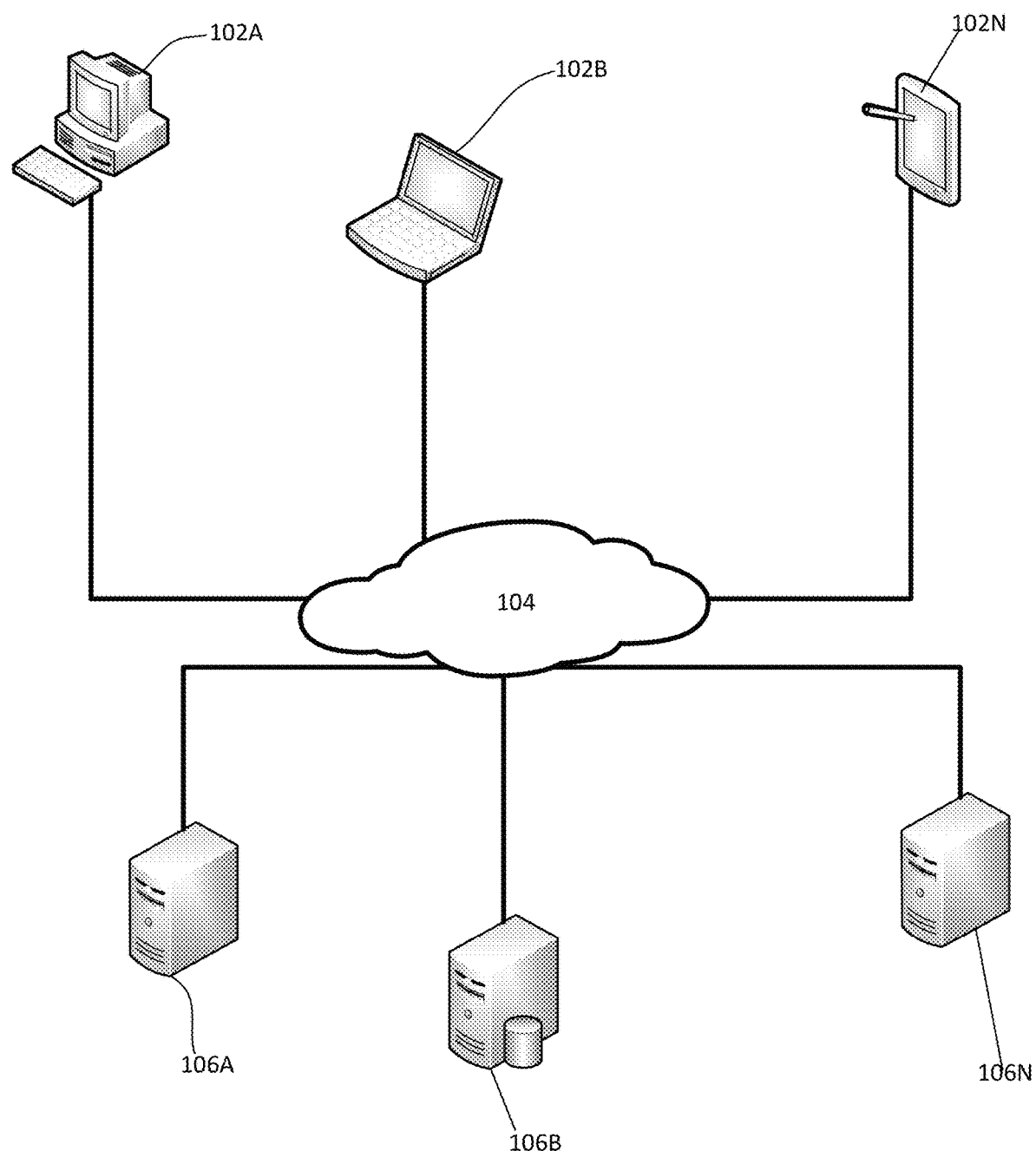
FIG. 1 is an illustration of an exemplary network and computing environment.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The term "sensitive information," as used herein, refers to data that must be protected from unauthorized access to protect the privacy and/or security of a user or an entity. Examples may include access credentials, personal information, medical information, financial information, unique identifiers such as social security information, biometric data, trade secrets, customer and supplier information, employee data, or the like.

The term "authentication credential" refers to an electronic token or other object unique to a user that the user can present to gain access to a computing system. Example authentication credentials may include, without limitation, a username, a password, a biometric, an answer to a security question, a combination of any of the foregoing and/or the like.

Referring now to FIG. 1, a schematic block diagram illustrating an example computing environment in which the embodiments described herein may be implemented is shown. FIG. 1 illustrates one embodiment of a computing environment 101 that includes one or more client machines 102A-102N (generally referred to herein as "client machine(s) 102A-N") in communication with one or more servers 106A-106N (generally referred to herein as "server(s) 106A-N"). Installed in between the client machine(s) 102A-N and server(s) 106A-N is a network 104.

In one embodiment, the computing environment 101 can include an appliance installed between the server(s) 106A-N and client machine(s) 102A-N (not shown here). This appliance may manage client/server connections, and in some cases can load balance client connections amongst a plurality of backend servers. For example, the appliance may be a cloud management server and/or a cloud connector that may provide a communication link between the client machine(s) 102A-N and the server(s) 106A-N for accessing computing resources (cloud hardware and software resources) hosted by the server(s) 106A-N in a cloud-based environment. The management server may run, for example, CLOUDSTACK by Citrix Systems, Inc. of Ft. Lauderdale, Fla., or OPENSTACK, among others. The cloud hardware and software resources may include private and/or public components. For example, a cloud may be configured as a private cloud to be used by one or more particular customers or client computers and/or over a private network. In other embodiments, public clouds or public-private clouds may be used by other customers over open or closed networks.

The client machine(s) 102A-N can in some embodiment be referred to as a single client machine or a single group of client machines, while server(s) 106A-N may be referred to as a single server or a single group of servers. In one embodiment, a single client machine communicates with more than one server, while in another embodiment a single server communicates with more than one client machine. In yet another embodiment, a single client machine communicates with a single server.

Client machine(s) 102A-N can, in some embodiments, be referenced by any one of the following terms: client machine(s); client(s); client computer(s); client device(s); client computing device(s); local machine; remote machine; client node(s); endpoint(s); endpoint node(s); or a second machine. The server(s) 106A-N, in some embodiments, may be referenced by any one of the following terms: server(s), local machine; remote machine; server farm(s), host computing device(s), or a first machine(s).

In one embodiment, one or more of the client machine(s) 102A-N can be a virtual machine. The virtual machine can be any virtual machine, while in some embodiments the virtual machine can be any virtual machine managed by a hypervisor developed by Citrix Systems, IBM, VMware, or any other hypervisor. In other embodiments, the virtual machine can be managed by any hypervisor, while in still other embodiments, the virtual machine can be managed by a hypervisor executing on a server or a hypervisor executing on a client machine.

The client machine(s) 102A-N can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include one or more client machine(s) 102A-N that display application output generated by an application remotely executing on a server(s) 106A-N or other remotely located machine. In these embodiments, the client machine(s) 102A-N can display the application output in an application window, a browser, or other output window. In one embodiment, the application is a desktop, while in other embodiments the application is an application that generates a desktop.

The server(s) 106A-N, in some embodiments, execute a remote presentation client or other client or program that uses a thin-client or remote-display protocol to capture display output generated by an application executing on a server and transmit the application display output to a remote client machine(s) 102A-N. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server(s) 106A-N such that the server(s) 106A-N are logically grouped together into a server farm. The server farm can include servers that are geographically dispersed and logically grouped together in a server farm, or servers that are located proximate to each other and logically grouped together in a server farm. Geographically dispersed servers within a server farm can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm may be administered as a single entity, while in other embodiments the server farm can include multiple server farms.

In some embodiments, a server farm can include server(s) 106A-N that execute a substantially similar type of operating system platform (e.g., WINDOWS NT, manufactured by Microsoft Corp. of Redmond, Wash., UNIX, LINUX, or SNOW LEOPARD.) In other embodiments, the server farm can include a first group of servers that execute a first type of operating system platform, and a second group of servers that execute a second type of operating system platform. The server farm, in other embodiments, can include servers that execute different types of operating system platforms.

The server(s) 106A-N, in some embodiments, can be any server type. For example, a server can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server executing an active directory; or a server executing an application acceleration program that provides firewall functionality, application functionality, or load balancing functionality. In some embodiments, a server may be a RADIUS server that includes a remote authentication dial-in user service. In embodiments where the server comprises an appliance, the server can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from one or more client machine(s) 102A-N, forwards the request to a second server 106B, and responds to the request generated by the client machine(s) 102A-N with a response from the second server 106B. The first server 106A can acquire an enumeration of applications available to the client machine(s) 102A-N and well as address information associated with an application server hosting an application identified within the enumeration of applications. The first server 106A can then present a response to the client's request using a web interface, and communicate directly with the client machine(s) 102A-N to provide the client machine(s) 102A-N with access to an identified application.

The server(s) 106A-N can, in some embodiments, execute any one of the following applications: a thin-client application using a thin-client protocol to transmit application display data to a client; a remote display presentation application, or the like. Another embodiment includes a server that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machine(s) 102A-N can, in some embodiments, be a client node that seek access to resources provided by a server. In other embodiments, the server(s) 106A-N may provide client machine(s) 102A-N with access to hosted resources. The server(s) 106A-N, in some embodiments, may function as a master node such that it communicates with one or more client machine(s) 102A-N or server(s) 106A-N. In some embodiments, the master node can identify and provide address information associated with a server hosting a requested application, to one or more clients or servers. In still other embodiments, the master node can be a server farm, a client machine, a cluster of client nodes, or an appliance.

One or more client machine(s) 102A-N and/or one or more server(s) 106A-N can transmit data over a network 104 installed between machines and appliances within the computing environment 101. The network 104 can comprise one or more sub-networks, and can be installed between any combination of the client machine(s) 102A-N, server(s) 106A-N, computing machines and appliances included within the computing environment 101. In some embodiments, the network 104 can be: a local-area network (LAN); a metropolitan area network (MAN); a wide area network (WAN); a primary network comprised of multiple sub-networks located between the client machines 102A-N and the servers 106A-N; a primary public network with a private sub-network; a primary private network with a public sub-network 4; or a primary private network with a private sub-network. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 2:
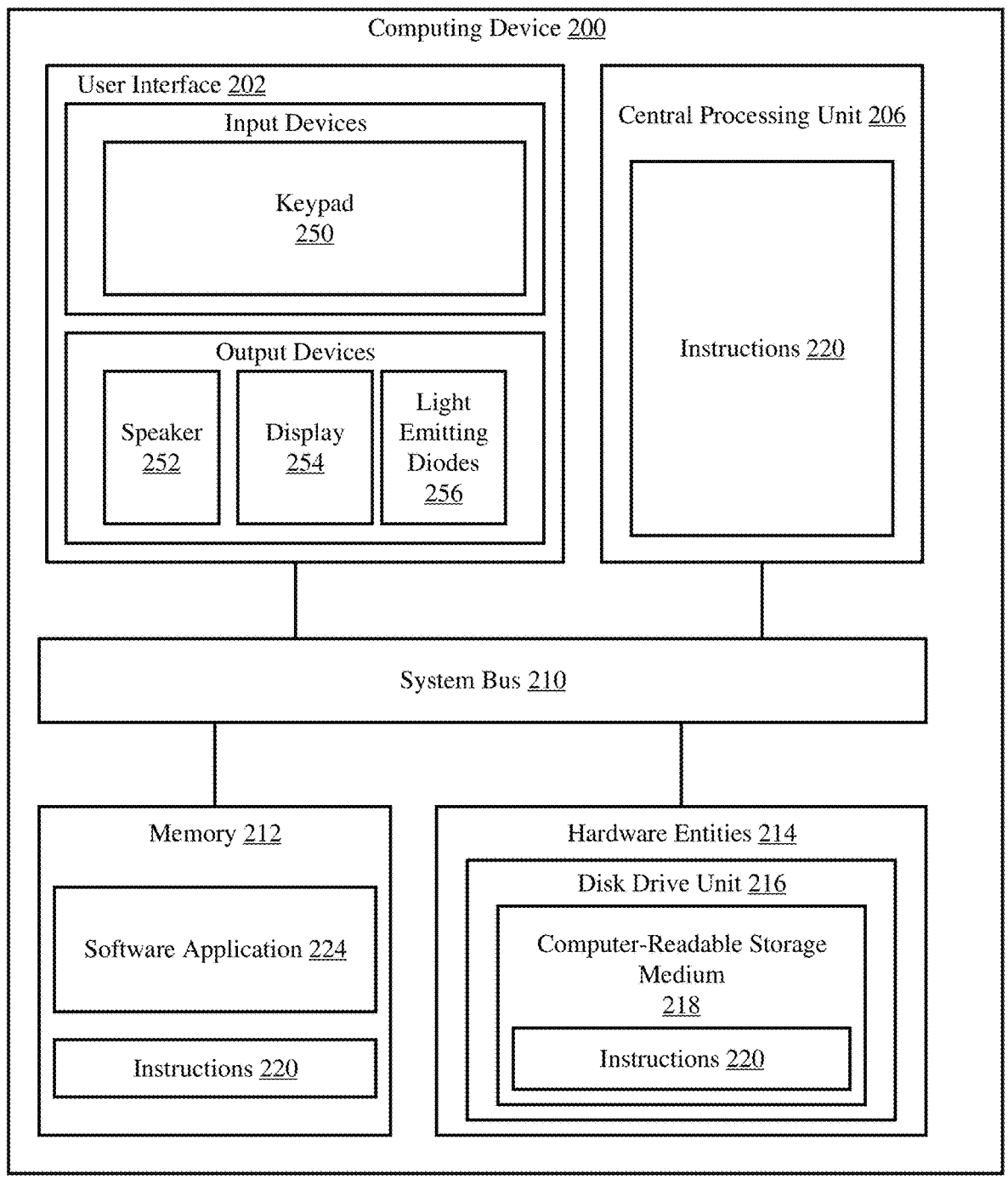
FIG. 2 is an illustration of an exemplary computing device.

Referring now to FIG. 2, there is provided a detailed block diagram of an exemplary architecture for a computing device 200, where the client machine(s) 102A-N and server(s) 106A-N illustrated in FIG. 1 can be deployed as and/or executed on any embodiment of the computing device 200. As such, the following discussion of computing device 200 is sufficient for understanding client machine(s) 102A-N and/or server(s) 106A-N of FIG. 1.

Computing device 200 may include more or less components than those shown in FIG. 2. However, the components shown are sufficient to disclose an illustrative embodiment implementing the present solution. The hardware architecture of FIG. 2 represents one embodiment of a representative computing device configured to facilitate storage and/or transmission of sensitive information in a cloud computing environment. As such, the computing device 200 of FIG. 2 implements at least a portion of a method for (a) determining an appropriate authentication protocol based on the user context, and (b) authenticating a user based on the authentication protocol, via a plurality of authentication services, as discussed below.

Some or all the components of the computing device 200 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the computing device 200 comprises a user interface 202, a Central Processing Unit ("CPU") 206, a system bus 210, a memory 212 connected to and accessible by other portions of computing device 200 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the computing device 200.

At least some of the hardware entities 214 perform actions involving access to and use of memory 212, which can be a RAM, a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the computing device 200. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 222 for execution by the computing device 200 and that cause the computing device 200 to perform any one or more of the methodologies, as described herein.

In some scenarios, the hardware entities 214 include an electronic circuit (e.g., a processor) programmed for facilitating authenticating a user based on the authentication protocol, via a plurality of authentication services. In this regard, it should be understood that the electronic circuit can access and run a software application 224 installed on the computing device 200. The functions of the software application 224 will become apparent as the discussion progresses.

Figure 3:
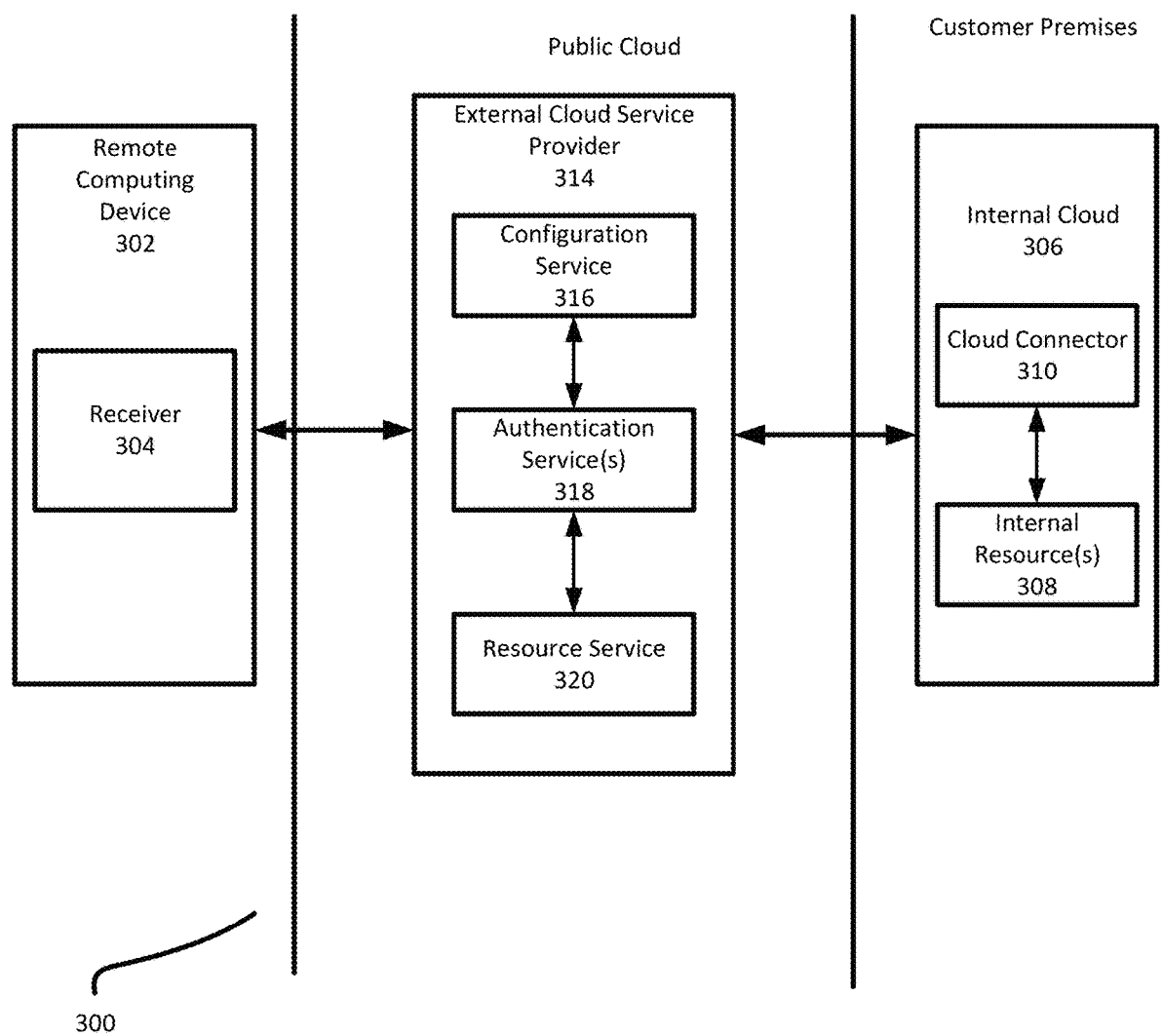
FIG. 3 is an illustration of an exemplary cloud computing environment.

Referring now to FIG. 3, an illustrative cloud computing system that may be used to implement one or more illustrative aspects described herein is shown. Cloud computing environment 300 may include more or less components than those shown in FIG. 3. However, the components shown are sufficient to disclose an illustrative embodiment implementing the present solution. Some or all the components of the computing environment 300 can be implemented as hardware, software and/or a combination of hardware and software, arranged to and/or programmed to perform one or more of the methodologies, procedures, or functions described herein.

As shown in FIG. 3, the cloud computing environment 300 comprises an external cloud service provider 314 for providing public cloud services and resources. The cloud computing environment further comprises a remote computing device 302, and an internal cloud 306 comprising a cloud connector 310. The cloud connector 310 facilitates communications between the internal cloud 306 and the external cloud service provider 314.

The system 300 is in the form of a cloud computing environment in which some resources of an entity are externally managed and located within the cloud of an external cloud service provider while other resources of the entity are internally managed by the entity (internal resources 308) and located within the entity's own servers or other computing devices. As used herein, variations of the term "internal" refers to resources managed by an entity itself and/or stored on one or more computing devices controlled by the entity and not controlled by an external cloud service provider. As an example, a resource may be stored at an on-premises server of the entity for remote access by authorized users associated with the entity. For instance, a particular software application (e.g., an internal application) may be stored on a server controlled and managed by an employer, and may be accessed by one or more of its employees. As used herein, variations of the term "external" refers to resources managed by an external cloud service provider and/or are stored on one or more computing devices controlled by the external cloud service provider. As an example, an external resource may be stored at a cloud-based server of the external cloud service provider for access by authorized users associated with the entity. In such an example, the external resource may also be associated with the entity. Resources (external and/or internal) may include, without limitation, a network, a file, data, a computing device, an application, a module, a cloud service, a function, or any other entity.

The cloud computing environment 300 includes an external cloud services provider 314 to provide public cloud services and resources. External cloud services provider 314 may include resources stored in its computing devices (not shown) that users can access over the Internet. External cloud services provider 314 may also transfer information from a particular internal computing device to another internal computing device at different premises of an entity that might not be part of external cloud services provider 314. As an example, a computing device that is part of a private cloud located at a particular geographic location may send information via the external cloud to another computing device that is also part of the private cloud of the entity (or may be a different private cloud of the entity) located at a different geographic location.

The external cloud services provider 314 may include various resources such as configurations services, single-sign on password services for on-premises active directories, one or more authentication services, self-service password reset services, on-premises active directory access services, data store access services, or the like.

In an embodiment, a configuration service 316 (also referred to as the "configuration service") may handle all inter service communication within the cloud for the external cloud services provider 314 (and/or the internal applications). The configuration service 316 may hold and manage a list of all services for the external cloud services provider, allowing them to advertise their addresses, or endpoints including the functionality that they provide. Only after a service successfully registers with the configuration service will it become active and able to communicate with other services and applications. Once done, the configuration service 316 will share a listing of all active and registered services as being active services. The configuration service 316 may store any service directory or list and related information into a configuration storage. The configuration storage may include any type and form of storage and/or memory, such as those described in connection with FIGS. 1 and 2. The information related to each service may be stored separately or together in the configuration storage and may be stored in any type of format. In an embodiment, the configuration service 316 may also store access credentials, encryption keys, sensitive information, or the like.

In an embodiment, a user of a cloud computing environment (e.g., cloud computing environment 300) may wish to access an internal resource installed on a geographically remote internal computing device and/or access or use an external resource located on an external server. The user can connect and/or otherwise communicate with the internal resource and/or the external resource via an external cloud service. In some instances, the user needs to be authenticated before providing access to the internal resource and/or the external resource. In such instances, a resource service 320 associated with the internal resource and/or the external resource may determine an authentication policy or protocol for authenticating the user, as will be discussed in further detail below. In an embodiment, a resource service 320 may be associated with one or more internal resources and/or the external resources. For example, a resource service 320 may receive a request from a user for accessing one or more internal and/or external resources, and may authenticate the user before granting the requested access. For single sign-on processes, the resource service 320 may, upon authentication, grant access to multiple resources or services, without requiring the user to provide authentication credentials to each individual resource. Upon receipt of an access request from a user, a resource service 320 may use a rule set to determine an appropriate authentication protocol for authenticating the user. The authentication protocol may be determined based on, authentication rules or rule sets corresponding to, without limitation, user-specific, device-specific, resource-specific authentication rules (discussed below). In an embodiment, resource service 320 may include a token issuer service. Token issuer may issue authorization information, authentication information, assertions such as tokens, or the like for various enterprise/resource services.

Examples of authentication protocols may include, without limitation, aggregate authentication protocols, cascading authentication protocols, conditional authentication protocols, realm-based authentication protocols, or the like. Aggregate authentication protocols for achieving authentication include multiple individual authentication schemes that must all be satisfied. For example, a two-factor authentication scheme can include both a password based authentication scheme and a hardware token based authentication scheme. A cascading authentication protocol may comprise requiring the user to satisfy only one of several specified authentication schemes. The authentication schemes may be typically ordered and tried one by one until the user successfully authenticates against one of them. In other embodiments, a conditional authentication protocol may comprise an ordered list of authentication schemes. After authenticating successfully to the first authentication scheme, the system may determine if other authentication schemes are required for that specific user. If so, it may continue until all requirements are met. Depending on logic, this may result in different authentication requirements on the user. For example, complex behaviors may be possible such that users belonging to a particular group may not be required to further authenticate to other authentication schemes. In another embodiment, a realm based authentication protocol may comprise a list of authentication schemes with each authentication scheme mapped to a single realm. When the user authenticates, he may explicitly specify the realm. This may force a specific authentication scheme to be used. The user may decide which authentication scheme to use.

In an embodiment, authentication protocols can include potentially any number of authentication schemes, and the examples provided here are certainly not exhaustive of the nature or arrangement of authentication schemes. An authentication protocol may include or may be associated with various types of authentication schemes such as, without limitation, knowledge based authentication, $2^{nd}$ factor authentication, biometric based authentication, password based authentication, certificate based authentication, Extensible Authentication Protocol (EAP) and developments thereof (e.g., PEAP [Protected Extensible Authentication Protocol], EAP-TLS [Tunnel Layer Security], EAP-TTLS [Tunneled Transport Layer Security], EAP-FAST [Flexible Authentication via Secure Tunneling]), Microsoft Challenge-Handshake Authentication Protocol (MS-CHAP [v1 and v2]), device- or network identifier-based authentication (e.g., media access control [MAC] address, internet protocol address, serial number, et cetera), non-encrypted or encrypted keys or tokens, key sharing, external device authentication (e.g., USB-key based unlock, smart cards), local or nonlocal passwords, network keys, time-based approaches, or the like. It is noted that any other login/ authentication method may implemented according to aspects disclosed herein. Furthermore, various embodiments associated with the innovations herein can use Active Directory™ for aspects relating to security as well as administration.

It will be appreciated that an authentication protocol can include a definition or identification of one or more authentication mechanisms, schemes, or processes, each of which may be executed or instantiated by a separate authentication service or module 318. Alternatively and/or additionally, an authentication service 318 may execute one or more authentication mechanisms, schemes, or processes. Each authentication service 318 can have associated software, hardware or firmware components such as executable or instantiable software functions, procedures, objects or classes and associated data structures or database information for configuration and for confirming authentication. Thus, an authentication protocol may include any combination of hardware or executable instructions executing on hardware. The authentication protocol may include an application, library, scripts, process, service, task or any type and form of executable instructions. The authentication protocol may provide functionality and operations described herein in via any type and form of interface, such as an API or function call. The authentication protocol may run as one or more services on a device, such as appliance and/or a server. The authentication framework may provide an interface such as a web service interface.

For example, a password authentication service may execute a password based authentication scheme for validating a password provided by a user. In another example, a knowledge based authentication service may execute a knowledge based authentication scheme for validating various responses provided by a user. In yet another example, an authentication service may include a CAPTCHA module (e.g., Completely Automated Public Turing test to tell Computers and Humans Apart), which may be a type of challenge-response test used in computing to determine whether or not the user is human. The data store, database or data structure of an authentication service, including information for authenticating a user, may include multiple credentials, data or attributes for authentication schemes provided by the authentication services such as, without limitation, biometric fingerprint information; biometric iris information, facial recognition images or definitions; voice recognition information; passphrases; registration of one or more hardware, software or firmware tokens; registration of a user-associated device such as a cellular or mobile telephone, tablet, computer system or other device; registration of personal information such as secret data including answers to questions, private information, telephone numbers, addresses, dates, relationship details and the like; certificate or certificate authority information; smart card registration; registration or reference to third party authentication services such as cloud computing authentication services, social network authentication information, cloud email services and the like; geographic information; and information required by any other authentication scheme suitable for use with authentication protocols in various presented herein. The credentials, data or attributes for authentication schemes provided by the authentication services may be added to the data store, database, or data structure, by a user, administrator, or the like upon user registration and may be maintained in the form of active directory or any other suitable format.

In an embodiment, an authentication service may be included in the resource service 320, and the authentication schemes associated with that authentication service may be executed by the resource service 320. In another embodiment, one or more of the authentication services may be part of other services or resources in the cloud computing environment 300. In another embodiment, a resource service may be included in an authentication service. In an embodiment, authentication service 318 may include a token issuer service.

In an embodiment, an active directory may be the authentication service and/or the resource service. In an alternate embodiment, an external and/or internal resource may be associated with its own token issuer service. For example, as discussed below (with respect to FIG. 5), a self-service password reset ("SSPR") includes a token issuer service.

In an embodiment, an external cloud service provider 314 may include a self-service password reset ("SSPR") service (not shown here) corresponding to a resource that permits users to reset an access credential that is used to access another resource such as a protected system, network, file, server, etc. The access credential may include a password, a smartcard pin, biometrics data, or other authentication mechanisms. A user who desires to reset an access credential may be asked to authenticate himself in some manner. If the user passes the authentication test, the user is permitted to reset his/her access credential and use it to access the resource. The user's rights to information or access within the resource may then be controlled via a permission setting associated with the user.

The cloud computing environment 300 also includes a remote computing device 302 (e.g., a client device), which may be a personal computer, laptop, tablet, smartphone, etc. and may include one or more components of a computing device discussed above. In some instances, remote computing device 302 may be the user's personal device (e.g., the user may own remote computing device 302). In such instances, remote computing device 302 might not be part of the internal cloud but may be able to login and/or otherwise access the internal cloud after the user has been authenticated. In other instances, remote computing device 302 may be owned by the entity managing and controlling the internal cloud (e.g., an employer-provided laptop). In such instances, when the user connects to remote computing device 302 to a terminal at the premises of the entity, remote computing device 302 may be part of the internal cloud. Otherwise, when the user uses remote computing device 302 outside of the premises of the entity (e.g., at the user's home), remote computing device 302 might not be part of the internal cloud but may be able to login and/or otherwise access the internal cloud after the user has been authenticated (e.g., via a virtual private network (VPN) connection).

The remote computing device 302 may include a receiver 304, which may be a client software installed on remote computing device 302. Receiver 304 may enable remote computing device 302 to access internal and/or external cloud services. As an example, remote computing device 302 may, using receiver 304, securely access applications, virtual desktops and data stored in the internal and/or external clouds. In one example, receiver 304 may be a Citrix Receiver developed by Citrix Systems, Inc. of Ft. Lauderdale, Fla.

The internal cloud of the cloud computing environment 300 may also include a cloud connector 310, which may analyze and/or intercept messages being sent from the internal cloud to the external cloud. In an embodiment, the cloud connector 310 may not be a part of the internal cloud. The cloud connector facilities communications between the services in the public cloud and the internal resource 308.

Figure 4:
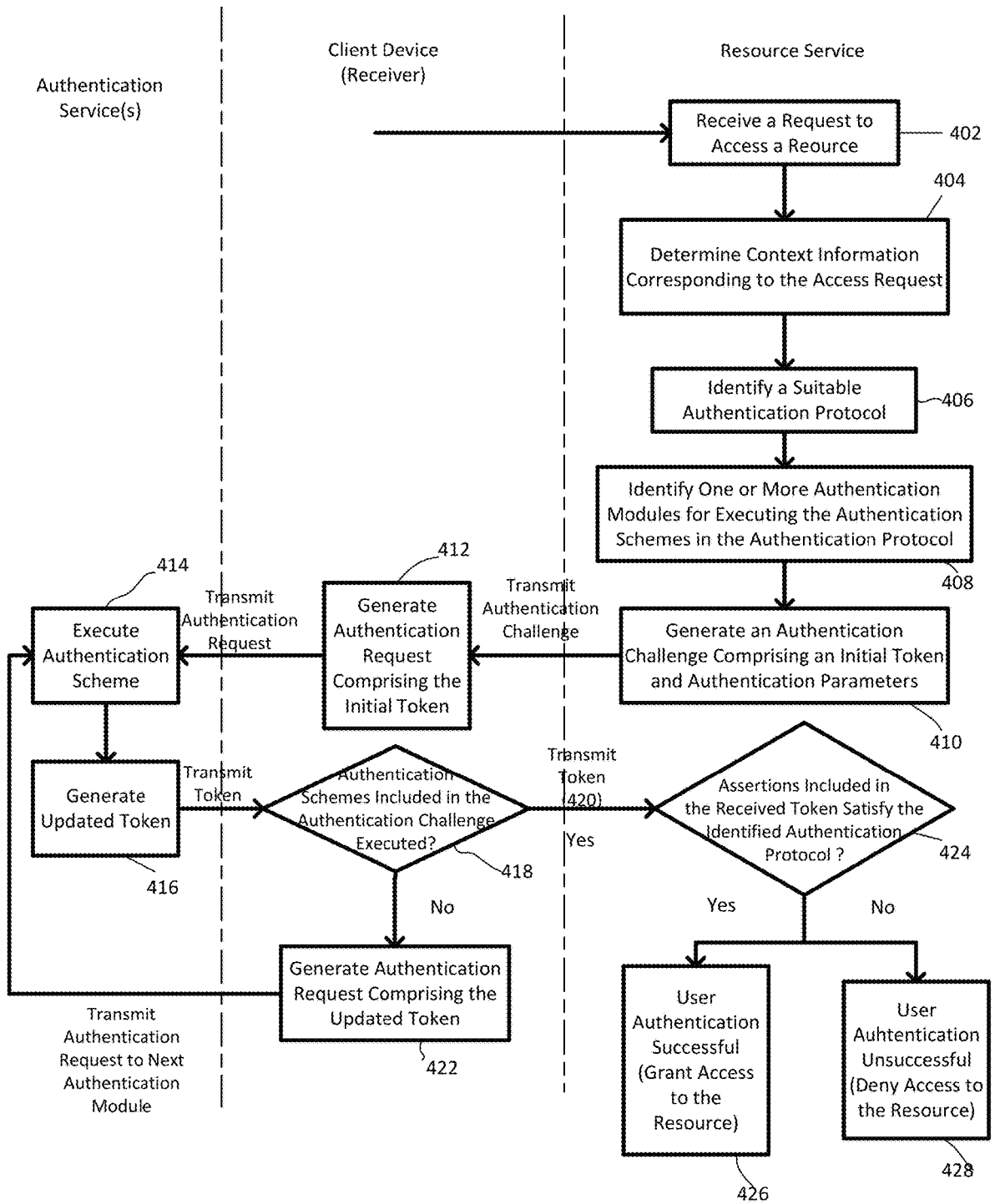
FIG. 4 is a flowchart illustrating an example method for authenticating a user before granting access to a resource in a cloud environment.

Referring now to FIG. 4, an example method 400 for the authentication and authorization of a user before providing access to a resource in a cloud environment is illustrated. An example cloud environment 300 is illustrated in FIG. 3. Process 400 may be performed by a system, such as system 100. For example, in one or more embodiments, the process 400 illustrated in FIG. 4 and/or one or more steps thereof may be performed by a computing device (e.g., any device of FIGS. 1-2). In other embodiments, the process illustrated in FIG. 4 and/or one or more steps thereof may be embodied in computer-executable instructions that are stored in a computer-readable medium, such as a non-transitory computer-readable memory. Alternatively or additionally, any of the steps in process 400 may be performed on any client device, gateway device, cloud connector, resource service, authentication service, external cloud provider and associated services, and/or third-party server or computing device.

The process starts at 402 when a resource service of a cloud environment receives a request to access ("access request") a resource associated with the resource service. In an embodiment, the resource service may receive the request via a receiver of a client device and/or a remote computing device. In alternate embodiment, the resource service may also receive the request including the user information via, for example, a load balancer, or another device of the cloud environment. In an embodiment, the access request may include user information, where user information refers to information about a user that may be used for identifying a user requesting access to a resource. Examples may include, without limitation, user name, client device identification, user identification number, password, or the like. The resource service may use the user information to identify the user requesting access by, for example, using an active directory of users registered with the cloud computing system or resource.

Upon receipt of the access request, the resource service may determine, identify, and/or retrieve 404 context information corresponding to the access request and the identified user. Context information corresponding to the access request refers to information relating to one or more characteristics of the user requesting access, the client device, the resource to be accessed, or a combination thereof. Examples of context information may include, without limitation, a location of the user, such as a geographic location, a relative location, a network location etc.; information about the client device with or via which the user requests access to the resource, such as a type of device, network or facility (e.g. tablet, laptop, desktop, terminal, smartphone and the like) or a specific device, model and manufacturer, serial number etc.; characteristics of a device or software component with or via which the user requests access to the resource, such as an operating system type or version, a security configuration, a state of operation, a software configuration state including the installation or configuration of certain security software and the like; a category, class, group, or type of the user, such as a user class assigned by a system administrator, or a job role or function of the user; a category, class or type of the resource, such as type of data, type of processing, file formats, etc. provided by the resource, level of security associated with the resource, or the like. Other suitable contextual information and/or characteristics will be apparent to those skilled in the art and embodiments of described herein are not limited to specific characteristics.

The context information may be associated with, included in, and/or implied from the access request and may define one or more characteristics at the time the access is requested as described above. For example, some or all of the context information can be included with the access request as one or more data items of the access request. For example, the request may include a token associated with a client device, an identification of the user and/or client device, a location of the user and/or client device, or other information associated with the user. Alternatively, the context information can be discernible from, implied by, determined based on or otherwise inferred from the access request (for example, based on the user identity). In an embodiment, some or all of the context information may be received from another device, such as an active directory, a service, a server, a system administrator, or the like. For example, characteristics of the user, characteristics of the access request, characteristics of the resource, the manner of receipt of the access request, a network route or trace of the access request, or third party information regarding the access request such as information from intermediaries between the user and the resource service can be used to determine the user context. Additionally or alternatively, the context information can be wholly or partly included in the access request.

Example sources of context information can include: network routes; network address; network location; network intermediary information; user-side software information such as software type, version and/or configuration information; user device information such as device type (cellphone, laptop, tablet, internet café device etc.), configuration and/or version or model information; frequency of request by the user; recent request information such as recent authentication request outcomes (permitted or prevented); user personal details such as user age, circumstances; user physical or mental capabilities; user geographic location; user movement across a geography; the use of intermediaries between the user and the resource service such as anonymity services, proxies, virtual private network services and the like; a level of security of a system employed by the user or as part of network communication with the user; a level of encryption of information communicated to and/or from the user; and the like.

At 406, the resource service may use the user information and/or the current context information to identify a suitable authentication protocol for authenticating the user before granting access to the requested resource by accessing a rule set. In an embodiment, each resource and/or resource service may be associated with its own rule set. Alternatively and/or additionally, one or more resources and/or resource services may be associated with the same rule set.

In an embodiment, the rule set includes logic rules for identifying a suitable authentication level for the access request based on the user identity and/or context information, and associating the authentication level with at least one authentication protocol. For example, the rule set may provide a particular authentication level as a level or degree of assurance required to authenticate a user requesting access to a resource based on the overall context information. Thus, certain context types and/or values will be predetermined to require higher levels of assurance than other context types and/or values, and an authentication level for the overall context information is selected accordingly. In other words, the authentication level may be a function of the user identity and/or various factors included in the context information such as, without limitation, location of the user, user role, resource type, or the like. For example, a high authentication level may be assigned to a system administrator irrespective of location, whereas a high authentication level may be assigned to another user only if request access to a resource from a public location. In another example, a low authentication level may be assigned to a resource access request during certain times of the day, or if the location of the user is determined to be an authorized enterprise location. In some other examples, the authentication level may take into account an amount of time since a last successful authentication request. In yet another example, the resource information may also be used in determining the authentication level. For example, a gaming application may have lower security requirements (low risk index), while a banking service could have higher security requirements (high risk index). Evolving security requirements could also be supported using this method (e.g., security requirements for a photo sharing service increases due to new policies). As another example, a user could be attempting to complete an online transaction of some dollar amount each of which may have particular risks, e.g., Transaction Dollar Amount (e.g., low authentication level for less than $100.00, medium authentication level for less than $1000.00, or high authentication level for greater than $1000.00). Demographic profile data may also be utilized as contextual input in determining security requirements.

It will be understood that the selection or definition of the authentication levels (high, low, medium, etc.) is provided as an example and any other suitable authentication levels, values, and/or range of values, may be defined without departing from the principles described herein. For instance, the access request may be assigned an authentication level of from 0-10 with 0 indicating the lowest authentication level and 10 indicating the highest authentication level based on the user identity and/or collected context information, for example, by assigning scores to individual context information elements (or factors) and combining these individual scores to obtain the authentication level for the access request, or in any other suitable manner.

In an embodiment, the rule set may also associate various authentication levels with at least one authentication protocol, each authentication protocol comprising one or more authentication schemes to achieve authentication with a particular level of assurance. Hence, authentication protocols are defined or selected so as to provide a level or degree of assurance of authentication predetermined to be appropriate for an authentication level. Authentication protocols range from very high security methods, such as a multi factor aggregate authentication protocol to lower security but more convenient and socially acceptable methods, such as simple password entry. Furthermore, the authentication schemes included in an authentication protocol may be varied depending upon the authentication level required. For example, a first knowledge based authentication scheme may include three questions for the user to answer and a second knowledge based authentication scheme may include five different questions for a user to answer. In another example, the authentication protocol may require different levels of trust for the same authentication schemes. For example, an authentication protocol including a knowledge based authentication scheme may require the user to submit a response that comprises five questions for the user. A first authentication protocol may be satisfied by a user answering four of the five questions correctly, while a second authentication protocol may require the user to respond to the authentication scheme but require all five questions to be answered correctly in order to satisfy the authentication protocol.

In an embodiment, the rule set may be dynamically determined and/or predetermined by, for example, an administrator. In an embodiment, an administrator may create and/or the rules sets for determining the authentication levels and/or the authentication protocols. In an embodiment, an administrator may create new authentication rules, levels and/or protocols; modify or delete existing rule sets; assign and reassign authentication levels to resources user groups and/or individual users; delete user registrations, or the like. For example, an administrator may create new authentication protocols by combining various authentication schemes and assign the protocols to authentication levels. If necessary or desirable, an administrator may import or create new authentication schemes in addition to the schemes already defined. The administrator may customize the characteristics of the authentication schemes and set pass/fail criteria for the schemes for various authentication protocols. The administrator can choose to apply or associate the new authentication schemes and/or protocols to particular resources, to individual users, and/or to user groups.

Referring back to FIG. 4, upon identification of the appropriate authentication protocol, the resource service may identify 408 one or more authentication services that may be required for executing the authentication schemes included in the identified authentication protocol. For example, the identified authentication protocol may include a first authentication scheme that is executed by a knowledge based authentication service, a second authentication scheme that is executed by a $2^{nd}$ factor authentication service, and a third biometrics based authentication scheme executed by a biometrics authentication service. In an embodiment, one or more authentication schemes may be executed by the same authentication service. Alternatively and/or additionally, one or more authentication services may execute one authentication scheme. In an embodiment, one or more authentication schemes may be executed by the authentication service and/or the resource service.

The resource service may then generate 410 an authentication challenge and may transmit the authentication challenge to the receiver of the client device from which the access request was received. In an embodiment, the authentication challenge includes an initial token. The initial token may include an initial assertion comprising statements such as the user identity, the action/resource being requested, the timestamp and other useful information. In an embodiment, if the resource service determines that one or more authentication schemes included in the identified authentication protocol have already been executed, the resource service may also include the status of such executed authentication schemes in the initial assertion. The authentication challenge and/or the initial assertion may also include, without limitation, authentication parameters for executing the identified authentication protocol. The authentication parameters may include, without limitation, information relating to the authentication schemes included in the identified authentication protocol, locations (e.g., uniform resource locators, IP addresses, or the like) and/or identification of the authentication services that may be required for executing the identified authentication schemes included in the identified authentication protocol, requirements and/or rules associated with the identified authentication protocol (e.g., an order in which authentication must be performed, description of how successful authentication should be performed by each authentication service, types of response requested from the authentication services, etc.), how to pass the resulting assertion back to the authentication service and/or the resource service, or the like. Format and parameters of the authentication challenge are flexible and may be tailored to accommodate various authentication scenarios. For example, an authentication challenge provided for a web-browser based application may include an HTTP redirect. The authentication challenge may be designed to be short lived using now or hereafter known methods. In an embodiment, the resource service may store the initial token, the authentication challenge, and/or the initial assertion.

In an embodiment, the resource service may use the Security Assertion Markup Language (SAML) standard or JSON Web Tokens (JWT) standard for providing the initial token. SAML and JWT are meant as examples and other suitable standards and/or protocols may be used. The initial token may include information, such as user identity, context information, digital certificate, a private or public key, authentication protocol information or parameters, or the like. In an embodiment, the resource service may add a nonce and/or a timestamp to the initial token. In some embodiments, the initial token may be signed in a manner that only allows it to be used once. In an embodiment, the resource service may also determine if the received access request includes any authentication credentials required by an authentication scheme included in the identified authentication protocol, and/or if the resource service can validate the user's authentication credentials. For example, the access request may include, without limitation, an authentication token that include one or more assertions (such as timestamps), a username, a password, or the like. If authentication credentials required by an authentication scheme included in the identified authentication protocol, the initial token may also include an assertion indicating that the resource service has verified the authentication credentials included in the access request.

Upon receipt of the authentication challenge, the receiver may detect the authentication parameters included in the authentication challenge and may generate 412 an authentication request that includes the initial token, and transmit the authentication request to at least one authentication service identified in the authentication challenge in accordance with the parameters set forth in the authentication challenge. For example, the receiver may transmit the authentication request to the authentication services in the order specified in the authentication challenge. The authentication request transmitted to an authentication service may also include the appropriate authentication requirements and parameters for the authentication scheme(s) to be executed by the authentication service. In an embodiment, the receiver may further include responses or credentials for the authentication scheme to be executed by the authentication services in the authentication request. In an embodiment, the receiver may add its own assertions to the initial token. For example, if the receiver determines that one or more authentication schemes included in the identified authentication protocol have already been executed, the receiver may include an assertion corresponding to the status of such executed authentication schemes.

At least one authentication service, may then instantiate, implement, operate or execute 414 the required authentication scheme (as per the authentication protocol) upon receipt of the authentication request from the receiver. In an embodiment, the authentication service may undertake one or more processes of transmitting challenges and/or receiving responses to/from the user (or other systems, such as hardware or software associated with the user or third party services providers that constitute part of one or more authentication schemes). For example, a knowledge based authentication service may issue a set of questions for a user to answer and authenticate the user by comparing the user response with the stored correct answers, and the authentication protocol requirements (for example, an authentication protocol may require 4 out of 5 correct answers for successful authentication). After execution of the authentication scheme, the authentication service may include, in the initial token, its own assertion that is indicative of the status (e.g., success, pass, failure, retry, locked out, change password, etc.) of the authentication scheme executed by the authentication service to generate 416 an updated token, and transmit the updated token back to the receiver. For example, the assertion may include one or more statements made by the authentication service (e.g., the subject is authenticated by a particular means at a particular time and the subject is associated with some specific attributes and the status of authentication e.g., success, pass, failure, retry, locked out, change password, etc.). In an alternate embodiment, the authentication service may include an assertion in the initial token only if the user responses match the stored correct information in accordance with the authentication protocol, indicating that the authentication was a success. Thus, an initial token that is returned without an assertion from the authentication service may indicate (to the receiver, the authentication service and/or the resource service, or another intermediary) that the authentication was unsuccessful.

Upon receipt of the token back from the at least one authentication service, the receiver may review the authentication parameters to determine 418 whether all the authentication schemes in the received authentication challenge have been executed as per the authentication parameters.

If at 418, the receiver determines that all the authentication schemes in the authentication challenge have been executed (418: YES), the receiver may transmit 420 the received token with the assertions from the various authentication services back to the resource service to request access. If, however, at 418 the receiver determines that all the authentication schemes in the authentication challenge have not been executed (418: NO), the receiver may generate 422 a new authentication request that includes the updated token (including previous assertions) and transmit the updated token to at least one authentication service identified in the authentication challenge and based on the parameters set forth in the authentication challenge, such that steps 414-418 are repeated.

In other words, transmission of a token from the receiver back to the resource service may indicate a conclusion of the identified authentication protocol. The resource service may then review the assertions included in the token to determine 424 whether the assertions included (or not included) in the received token satisfy the identified authentication protocol, i.e., determines a status of the identified authentication protocol (e.g., success, pass, failure, retry, locked out, need more information, etc.). If the user authentication is determined to be successful (424: YES), the resource service may grant 426 access to the requested resource. If the user authentication is not determined to be successful (424: NO), the resource service may deny 428 access to the requested resource.

In an embodiment, the resource service may discard the token upon completion of the identified authentication protocol for additional security. In an alternate embodiment, the resource service may discard the initial assertion upon completion of the identified authentication protocol such that the token cannot be reused for additional security. In yet another embodiment, the authentication service and/or the resource service, at 424 may also examine a timestamp of the token to determine whether it is within a threshold time limit to decide whether to grant access to increase security.

Alternatively and/or additionally, the receiver may review the response status received from an authentication service to determine the next steps based on the authentication parameters received from the resource service before determining whether all the authentication schemes in the received authentication challenge have been executed. For example, if an authentication service indicates that an authentication scheme was unsuccessful, the receiver may discontinue the authentication process if the authentication parameters require all authentication schemes to be successful for completing the authentication protocol. In another example, the receiver may select the next authentication scheme and/or module based on the status of the previous authentication scheme and the rules defined in the authentication parameters.

It should be noted that the access request received at 402 may also include an authentication token that contains one or more assertions. The resource service may verify the token in order to perform one or more of the following: grant access if the assertions included in the token satisfy the identified authentication protocol, demand further authentication if the assertions included in the token do not satisfy all the requirements of the identified authentication protocol, and/or demand a full authentication if the assertions included in the token do not meet any authentication requirements of the identified authentication protocol (as discussed above).

Figure 5:
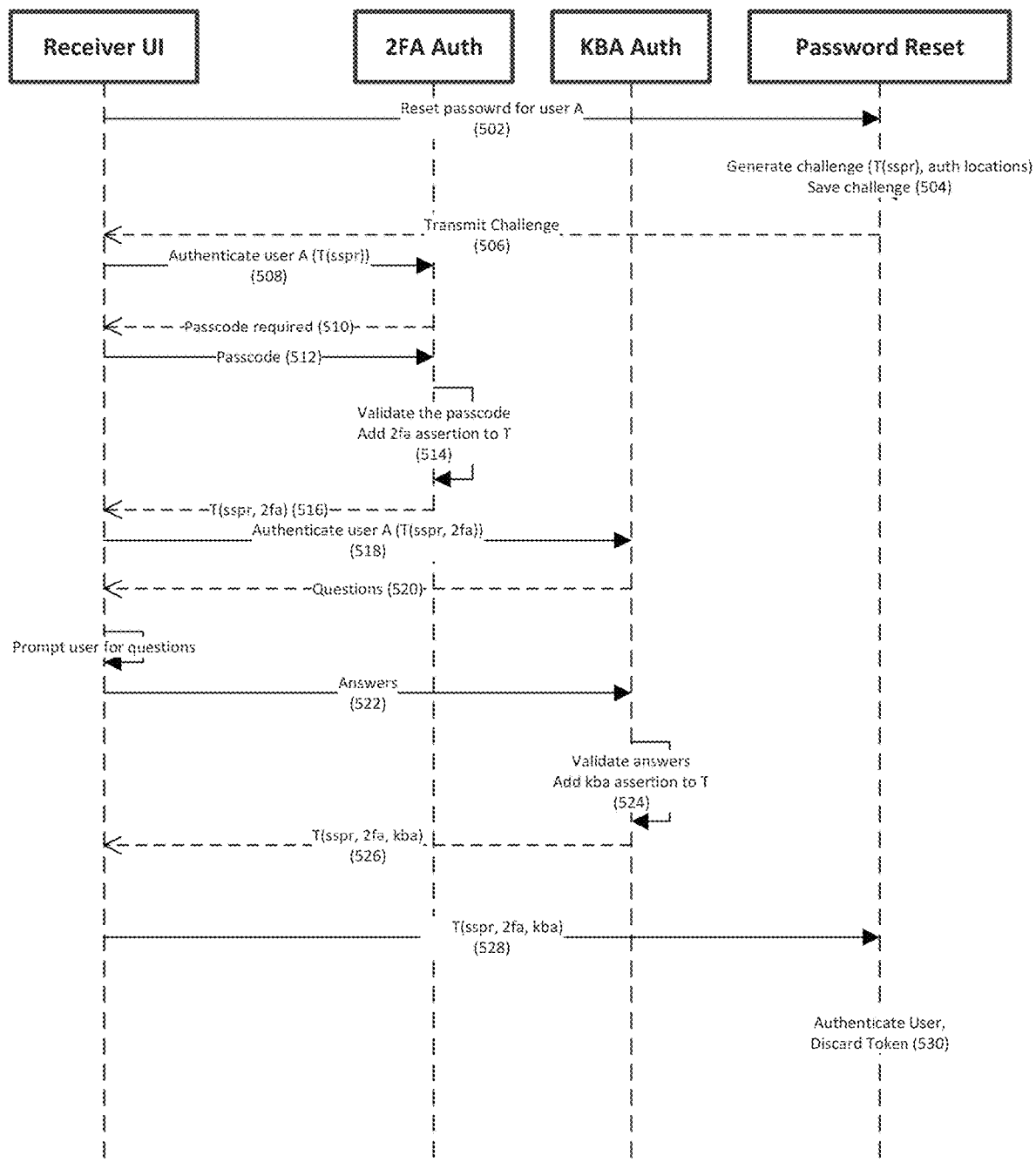
FIG. 5 is a message flow diagram illustrating an example method for authenticating a user requesting access to a self-service password reset service of a cloud computing environment.

Referring now to FIG. 5, the steps in an example message flow diagram describe a method for authenticating a user requesting access to a self service password reset (SSPR) service for changing an access credential (e.g., a password) using the methods described herein. It should be noted that while FIG. 5 illustrates a method for authenticating a user before providing access to an SSPR service using $2^{nd}$ factor authentication scheme and a knowledge-based authentication scheme, the teachings described herein are not so limiting, and similar principles may be used for authenticating a user for accessing other resources in a cloud computing environment using other authentication protocols (as discussed above).

The message flow may begin at 502 where a receiver provided by a remote computing device may transmit a request for resetting an access credential for an account (e.g., a password) to an SSPR service of an external cloud. In an embodiment, the access credentials may include any piece of information used to identify and/or authenticate a holder of the credentials, such as a user. For example, credentials include, but are not limited to, user identity (e.g., user number, username, etc.) and/or password, personal identification number (PIN), smart card identity, security certificates (e.g., a public key certificate), and features of the user (e.g., as captured by a sensor, such as a fingerprint reader, iris scan, voice recognizer, or other biometric, etc.), or any data used for authentication to access a particular internal/external resource.

Upon receipt of the request for resetting an access credential, the SSPR service may determine, identify, and/or retrieve context information corresponding to the request, and use the context information to identify a suitable authentication protocol, as discussed above with respect to FIG. 4. In the example message flow diagram illustrated in FIG. 5, the identified authentication protocol includes two authentication schemes—$2^{nd}$ factor authentication scheme and a knowledge-based authentication scheme (it should be noted that the methods described herein are not so limiting and additional and/or alternate authentication schemes or protocols may be used). The SSPR service may then generate and save 504 an authentication challenge that includes an initial token (T(sspr)) including an initial assertion and authentication parameters corresponding the identified authentication protocol. For example, the authentication challenge may include locations and/or identifications of various authentication services for executing the authentication schemes (i.e., $2^{nd}$ Factor Authentication service and Knowledge-Based Authentication service) included in the identified authentication protocol (auth locations). The initial assertion may include action/resource requested (e.g., password reset service in this embodiment) and a timestamp. The SSPR service may transmit 506 the challenge to the receiver.

The receiver may then detect the authentication parameters included in the authentication challenge. For example, as shown in FIG. 5, the authentication request may include authentication parameters identifying the authentication services ($2^{nd}$ Factor Authentication service and Knowledge-Based Authentication service) to be used for executing the authentication schemes included in the identified authentication protocol. The receiver may, at 508, transmit a first authentication request to the $2^{nd}$ Factor Authentication service along with the initial token T(sspr) and appropriate authentication parameters. As discussed above, the $2^{nd}$ Factor Authentication service may execute the required authentication scheme (i.e., $2^{nd}$ Factor Authentication) upon receipt of the authentication request from the receiver by issuing 510 a passcode (or any other authentication credential) request to a device (such as the receiver, mobile device, or any other device) associated with the user and may receive 512 passcode in response. At 514, the $2^{nd}$ Factor Authentication service validates the user by comparing received passcode with the stored correct passcode, and may add an assertion to the initial token T(sspr) indicating successful passcode authentication if the received passcode matches the stored passcode. The $2^{nd}$ Factor Authentication service may then transmit 516 the updated token including its assertion T(sspr, 2fa) to the receiver.

Upon receipt of the token T(sspr, 2fa) from the $2^{nd}$ Factor Authentication service, the receiver may review the authentication parameters to determine that the authentication schemes in the received authentication challenge have been not been executed (as discussed above, the identified authentication protocol comprises two authentication schemes) as per the authentication parameters. The receiver may then transmit 518 a second authentication request to the Knowledge-Based Authentication service that includes the received token T(sspr, 2fa). The Knowledge Based Authentication service may then execute the required authentication scheme (i.e., knowledge based authentication) by issuing 520 a set of questions for a user to answer and authenticate the user by comparing the user responses with the stored correct answers. In an embodiment, the receiver or another user device or portal may be used by Knowledge Based Authentication service for issuing the questions and receiving the user responses. At 522, the Knowledge Based Authentication service may receive answers from the user and may validate 524 the user if the received answers or responses match the stored responses, and add an assertion indicating successful KBA authentication to the T(sspr, 2fa) token to generate a T(sspr, 2fa, kba) token. The Knowledge Based Authentication service may then transmit 526 the updated token including its assertion T(sspr, 2fa, kba) to the receiver.

Upon receipt of the token T(sspr, 2fa, kba) from the Knowledge Based Authentication service, the receiver may review the authentication parameters to determine that the authentication schemes in the received authentication challenge have been executed as per the authentication parameters, and may transmit 528 the token T(sspr, 2fa, kba) to the SSPR service. Upon receipt of the token T(sspr, 2fa, kba), the SSPR service may grant permission to change the access credential, and discard 530 the received token to ensure one time usage of the token. In an embodiment, the SSPR service may examine the timestamp of the token and/or the initial assertions of the saved challenge to determine whether to grant permission based on the time elapsed to increase security. The SSPR service may also remove the stored initial assertion upon granting permission to change the access credential to ensure that the token can only be used once to increase security.

Alternatively and/or additionally, at 518, the receiver may transmit only T(sspr) to the Knowledge Based Authentication service. The Knowledge Based Authentication service may then execute the required authentication scheme (i.e., knowledge based authentication) by issuing 520 a set of questions for a user to answer and authenticate the user by comparing the user responses with the stored correct answers. In an embodiment, the receiver or another user device or portal may be used by Knowledge Based Authentication service for issuing the questions and receiving the user responses. At 522, the Knowledge Based Authentication service may receive answers from the user and may validate 524 the user if the received answers or responses match the stored responses, and add an assertion indicating successful KBA authentication to the T(sspr) token to generate a T(sspr, kba) token. The Knowledge Based Authentication service may then transmit 526 the updated token including its assertion T(sspr, kba) to the receiver. The Receiver may then combine T(sspr, 2fa) and T(sspr,kba) to create T(sspr, 2fa, kba) and transmit 528 T(sspr, 2fa, kba) to the SSPR service.

Alternatively and/or additionally, the Receiver may transmit 528 T(sspr, 2fa) and T(sspr,kba) to the SSPR service without combining them.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method comprising:
    receiving, by a computing device, a request from a client device to access a resource; determining, by the computing device, context information that corresponds to the request and comprises a plurality of elements; assigning, by the computing device, scores to individual elements of the plurality of elements; combining the scores to generate a second score; assigning, by the computing device, an authentication level to the request based on a user identity and the combined score;
    generating, by the computing device, an authentication challenge based on the authentication level, the authentication challenge comprises an initial token, the initial token comprising the user identity, identification of the resource for which access is being requested, at least a portion of the context information, authentication parameters, and an assertion that authentication credentials included in the request have been verified;
    receiving, by the computing device, an updated token from the client device in response to transmission of the authentication challenge to the client device, the updated token generated by inclusion in the initial token an indication of authentication of a user of the client device to one or more authentication services, the authentication being accomplished with use of the authentication parameters, and the indication being included in the initial token by the one or more authentication services as a part of a response to an authentication request from the client device made in response to the authentication challenge; and
    providing, by the computing device, the client device with access to the resource based on the authentication of the user of the client device to one or more authentication services as indicated by the updated token.

2. The method of claim 1, further comprising saving the initial token by the computing device.

3. The method of claim 1, further comprising, by the computing device:
    identifying an authentication service for executing at least one authentication scheme; and
    including the identification of the authentication service in the authentication parameters.

4. The method of claim 3, further comprising:
    upon receipt of the authentication challenge, transmitting, by the client device, an authentication request comprising the initial token;
    receiving, by client device, the updated token which comprises an assertion indicating a status of user authentication upon execution of the at least one authentication scheme.

5. The method according to claim 4, further comprising: determining, by the client device, upon receipt of the updated token, whether all authentication schemes included in an identified authentication protocol have been executed; and upon determining that all authentication schemes included in the identified authentication protocol have been executed, transmitting the updated token to the computing device.

6. The method of claim 5, further comprising, by the computing device, granting the request for accessing the resource upon determining that the one or more assertions included in the updated token satisfy the identified authentication protocol.

7. The method of claim 6, further comprising, by the computing device, discarding the updated token upon granting the request for accessing the resource.

8. The method of claim 6, further comprising, by the computing device, discarding the initial token upon granting the request for accessing the resource.

9. The method of claim 6, further comprising, by the computing device:
determining whether a timestamp associated with the updated token is within a threshold time limit; and
granting the request for accessing the resource upon determining that the timestamp is within the threshold time limit.

10. The method of claim 5, further comprising upon determining that all authentication schemes included in the identified authentication protocol have not been executed, transmitting the updated token to a given authentication service.

11. The method of claim 1, wherein the initial token comprises an initial assertion indicating successful authentication of one or more authentication credentials included in the request.

12. The method of claim 1, wherein the request comprises user information identifying the user.

13. The method of claim 1, wherein the resource is a self-service password reset service.

14. The method according to claim 1, wherein the initial token includes information specifying performance of an execution of at least one authentication protocol by the one or more authentication services.

15. The method according to claim 1, wherein the indication comprises an assertion indicating a status of user authentication upon execution of at least one authentication scheme.

16. A computing system, comprising:
a processor; and a non-transitory computer-readable storage medium comprising programming instructions that are configured to cause the processor to implement a method for authenticating a user in the computing system, wherein the programming instructions comprise instructions to:
receive a request from a client device to access a resource; determine context information that corresponds to the request and comprises a plurality of elements; assign scores to individual elements of the plurality of elements;
combining the scores to generate a combined score;
assign an authentication level to the request based on a user identity and the combined score; generate an authentication challenge in accordance with the authentication level, the authentication challenge comprises an initial token, the initial token comprising the user identity, identification of the resource for which access is being requested, at least a portion of the context information, authentication parameters, and an assertion that authentication credentials included in the request have been verified;
receive an updated token from the client device in response to transmission of the authentication challenge to the client device, the updated token generated by inclusion in the initial token an indication of authentication of a user of the client device to one or more authentication services, the authentication being accomplished with use of at least one authentication protocol and the authentication parameters, and the indication being included in the initial token by the one or more authentication services as part of a response to an authentication request from the client device made in response to the authentication challenge; and
provide the client device with access to the resource based on the authentication of the user of the client device to the one or more authentication services as indicated by the updated token.

17. The computing system according to claim 16, wherein the programming instructions further comprise instructions to cause the client device to: transmit an authentication request that comprises the initial token; and receive the updated token that comprises an assertion indicating a status of user authentication upon execution of at least one authentication scheme.

18. The computing system according to claim 16, wherein the programming instructions further comprise instructions to cause the client device to: determine, upon receipt of the updated token, whether all authentication schemes included in an identified authentication protocol have been executed; and upon determining that all authentication schemes included in the identified authentication protocol have been executed, transmit the updated token to the processor.

19. The computing system according to claim 17, wherein the programming instructions further comprise instructions to cause the processor to grant the request for accessing the resource upon determining that the one or more assertions included in the updated token satisfy an identified authentication protocol.

* * * * *